May 22, 1951      R. A. SANDBERG      2,553,790
STEERING AND IGNITION LOCK
Filed Aug. 21, 1946      3 Sheets-Sheet 1
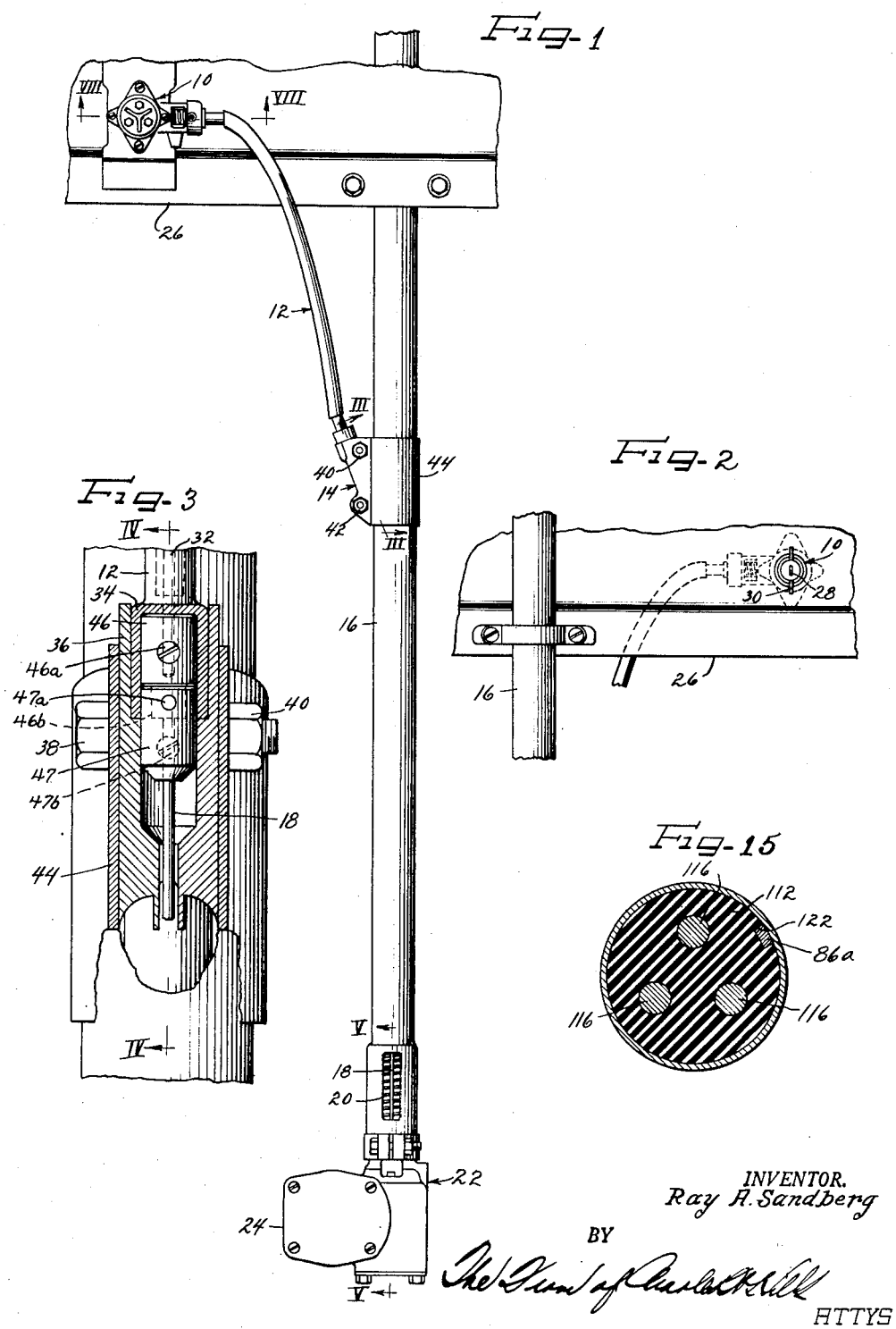
INVENTOR.
Ray A. Sandberg
BY
ATTYS

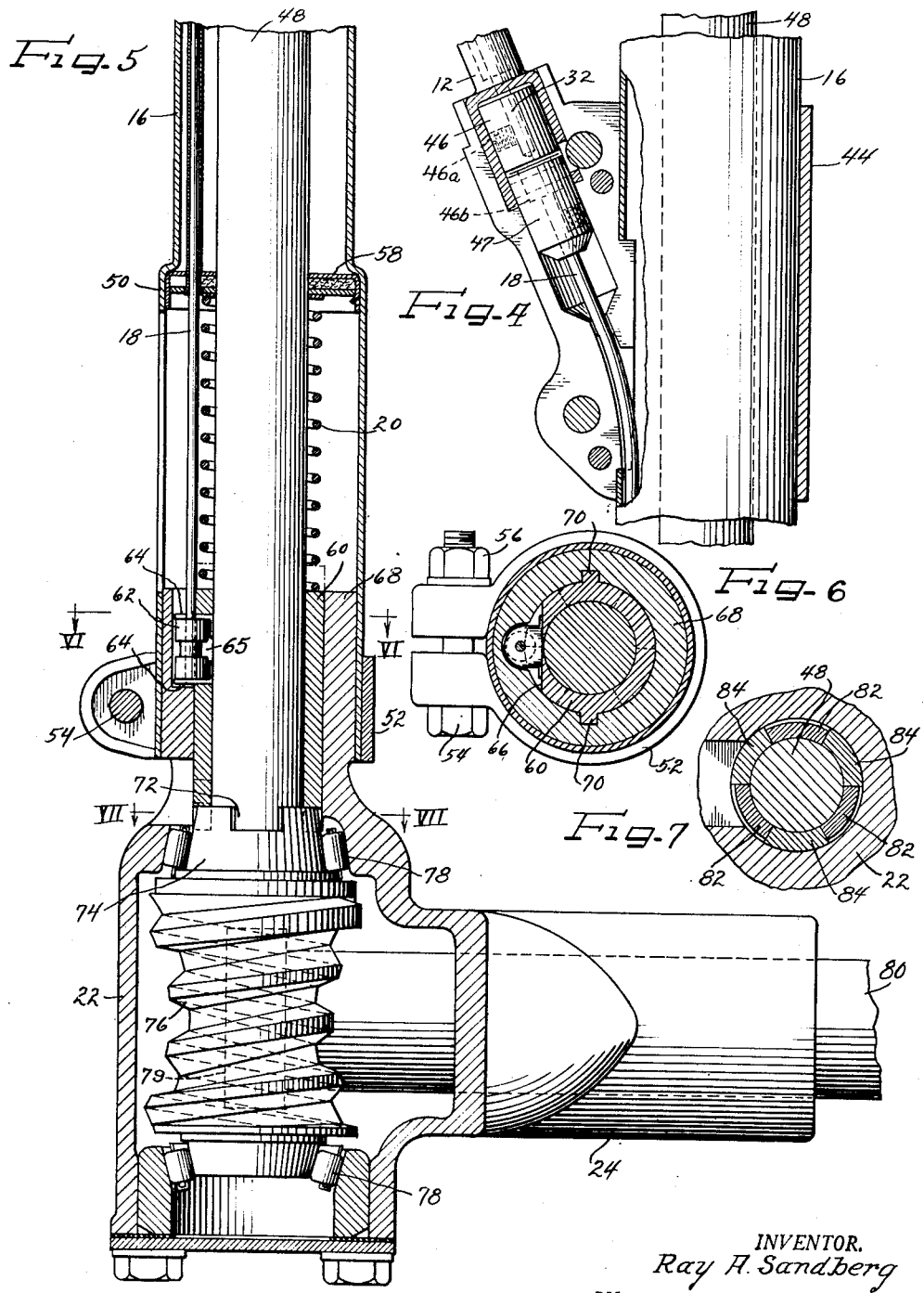

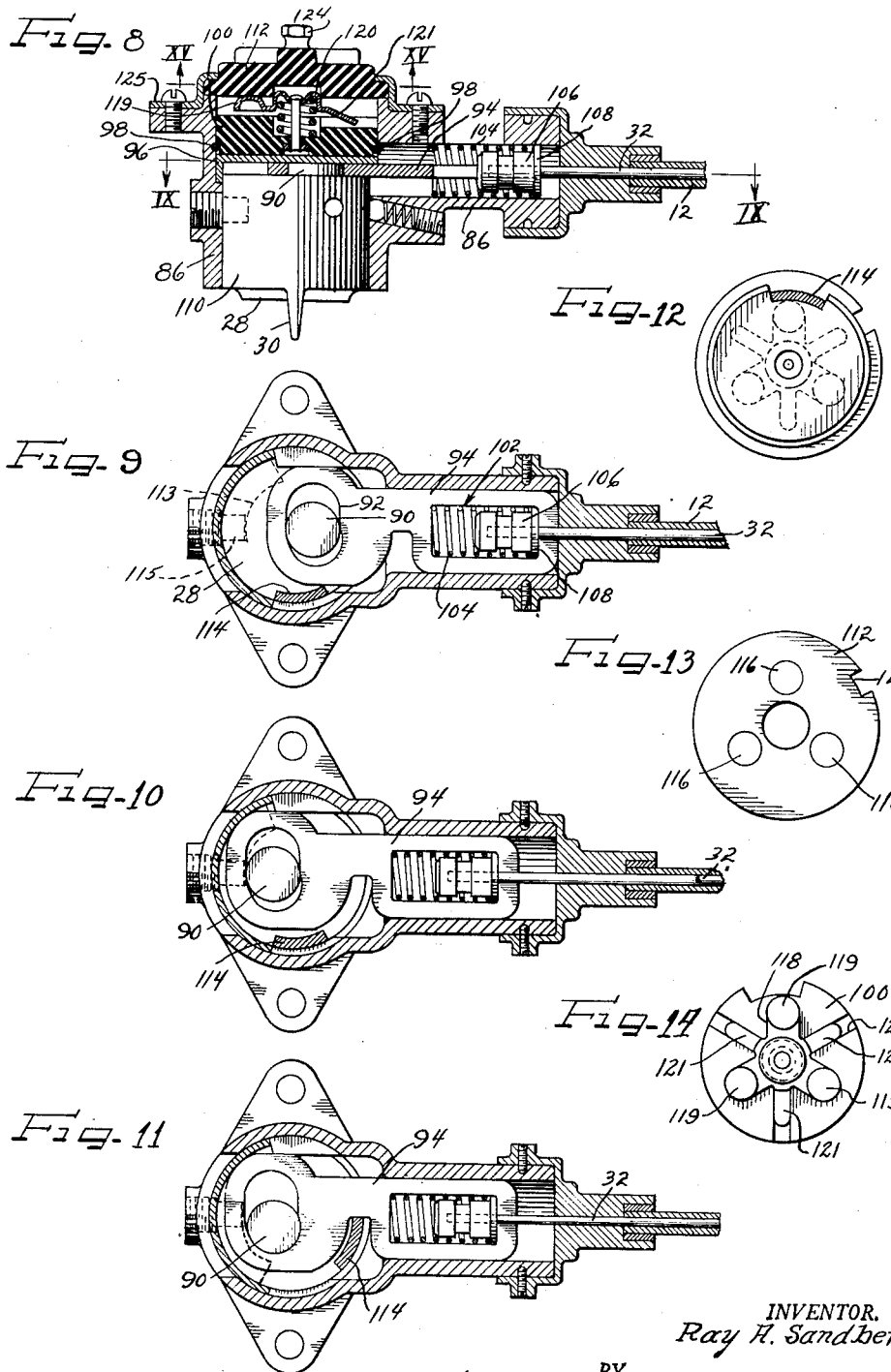

Patented May 22, 1951

2,553,790

UNITED STATES PATENT OFFICE 2,553,790

STEERING AND IGNITION LOCK

Ray A. Sandberg, Waukegan, Ill., assignor to Houdaille-Hershey Corporation, Detroit, Mich., a corporation of Michigan Application August 21, 1946, Serial No. 692,017

3 Claims. (Cl. 70—186)

My invention relates to locks for use on vehicles and more particularly to combined steering and ignition locks for automobiles.

In order to prevent possible theft of automobiles it is desirable securely to lock such vehicles against unauthorized use thereof. To this end, it is desirable not only to lock the ignition system in an inoperative condition but also to restrain the steering mechanism against turning. It is then impossible for a thief to operate the car unless he has both broken the steering lock and short circuited the ignition lock.

It is an object of my invention to provide an improved steering and ignition lock.

A further object of my invention is to provide an improved steering lock wherein blows imparted to the steering mechanism cannot break the lock.

Yet another object of my invention is to provide an improved steering and ignition lock wherein operation of a single locking mechanism first unlocks the steering device and then, upon further rotation, renders the ignition system operative.

Still another object of my invention is to provide a combined steering and ignition lock having features of construction, combination and arrangement whereby a simple, economical, and foolproof construction is achieved in a manner suitable for use on passenger automobiles.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing.

On the drawing:

Figures 1 and 2 are plan views showing portions of a steering assembly constructed in accordance with my invention;

Figure 3 is a cross sectional view through line III—III of Figure 1;

Figure 4 is a cross section view through line IV—IV, Figure 3;

Figure 5 is a cross section view through line V—V, Figure 1;

Figures 6 and 7 are cross section views through lines VI—VI and line VII—VII, of Figure 5, respectively;

Figure 8 is a cross section view of the lock mechanism through line VIII—VIII, Figure 1;

Figures 9, 10, and 11 are cross section views through line IX—IX, Figure 8, of the switch mechanism in the three positions of operation;

Figure 12 is a partial sectional view looking upwardly from line IX—IX of Figure 8 but showing the switch operated;

Figure 13 is a bottom plan view of a portion of the ignition and lock switch;

Figure 14 is a top plan view of the rotatable member in the ignition switch; and Figure 15 is a sectional view on line XV—XV of Figure 8.

As shown on the drawing:

Figure 1 is a completely assembled view of the lock mechanism. This mechanism consists of lock portion 10 connected by flexible sheath 12 to mechanism 14 which is mounted on steering post 16. As will be described in further detail hereafter, the lock mechanism 10 is connected through sheath 12 and mechanism 14 so as to reciprocate rod 18 in a manner to overcome the bias of spring 20 which otherwise locks shiftable elements located in housing 22 so as to prevent operation of the steering mechanism. Housing 22 also contains a worm gear which co-acts with a gear located in housing 24 to steer the vehicle front wheels. Figure 2 shows the view of lock mechanism 10 from the opposite side of dashboard 26. As is evident from this view, the lock mechanism includes two portions, keyhole member 28 and finger piece or hand operating portion 30. This lock is constructed in accordance with the well known principles of lock making so that when a key is inserted in keyhole member 28 that member may be rotated but that unless the key is inserted having the particular structure to which the lock corresponds this rotation cannot be made. As will be described in further detail hereafter, rotation of the key inserted in member 28 over a predetermined angular distance unlocks the steering mechanism whereas further rotation thereof causes the ignition system to be turned on.

The lock structure 10 is constructed in a manner to be described in further detail hereafter so that when the key is rotated a flexible shaft contained within flexible sheath 12 is pulled upwardly along the axis thereof. As shown in Figure 3, this flexible element, designated by 32, is entirely enclosed by sheath 12 but is free to move longitudinally with respect thereto. Sheath 12 is held in housing 14 by engagement of the expanded end 34 thereof within an enlarged shouldered recessed upper end portion of a bushing 36, which in turn is held in place in laterally extending abutting bracket portions of a split band 44 by bolt 38 and nut 40 extending through the bracket portion thereof and clamping the split ends of said band together. This bolt, together with a downwardly spaced bolt and nut 42, Figure 1, further acts to retain band 44 about steering post 16, thereby to hold this band and bushing in fixed relation relative to the steering mechanism. As shown in the cross section view of Figure 3 the slidable element 32 contained within flexible sheath 12 is attached to connector 46 by set screw 46a, and a reduced portion 46b of the plug 46 extends into a bore in plug 47 and is secured thereto by pin 47a. The flexible shaft or rod 18 is secured in connector plug 47 by set screw 47b. Thus as the key in lock 10 is rotated so as to move shaft 32 along flexible sheath 12, flexible shaft 18 is likewise reciprocated along steering post 16.

The operative engagement of flexible shaft elements 32 and 18 with connectors 46 and 47 is further shown in Figure 4 which shows a cross section view through the line IV—IV, Figure 3. This figure further shows how flexible element 18 passes down the annular space between steering shaft 48 and steering post 16.

The structure of the lock mechanism contained within housing 22, together with the arrangement of biasing spring 20 is shown in the enlarged view of Figure 5, which is taken through cross section V—V, Figure 1. As shown in this view, steering post 16 has an enlarged end portion 50 which is held in engagement with the upper portion 68 of housing 22 by means of strap 52 which is tightened by bolt 54 coacting with nut 56 (Figure 6). Washer 58 is provided at the end of portion 50 of steering post 16 and is held against upward movement by reason of the neck portion contained between portions 16 and 50. This washer acts to restrain the upper end of spring 20. The lower end of spring 20 acts against vertically shiftable lockinng sleeve 60 and tends to push it in the downward direction as seen in Figure 5. This sleeve is connected to flexible shaft 18 by means of anchor 62 which is secured to shoe 64, positioned in recess 65 and engaged wit sleeve 60 along the flattened surface 66, Figure 6. As further shown in Figure 6, lock sleeve 60 is held against rotation with respect to upper end 68 of housing 22 by reason of teeth 70 which coact with corresponding grooves in neck 68 of gear case 22.

The lower end 72 of steering shaft 48 is secured in any suitable manner to the hub 74 of the worm 76, which is held in place in housing 22 by bearings 78. The worm 76 meshes with gear 79 shown by dotted lines in Figure 5, gear 79 being fixed on shaft 80, which is carried by housing 24 and operates to steer the vehicle front wheels when rotated.

The upper portion of hub 74 and the lower portion of lock sleeve 60 are arranged for locking engagement when shaft 18 is released, thereby to restrain worm 76 from rotation. The arrangement whereby this is accomplished is shown in Figure 7 which is a cross sectional view through line VII—VII, Figure 5. As will be evident from this figure, sleeve 60 has a plurality of downwardly extending teeth 82 whereas hub 74 has a corresponding number of upwardly extending teeth 84. Thus when sleeve 60 is biased to the downward position by the action of spring 20, the teeth 84 mesh with the teeth 82 and prevent rotation of worm gear 76. On the other hand, when the bias of spring 20 is overcome by pull on shaft 18, sleeve 60 is moved in the upward direction until the teeth 82 no longer coact with the teeth 84 to hold the steering worm gear against rotation. Thus the steering mechanism is locked when flexible shaft 18 is released and becomes operable when shaft 18 is pulled upward.

The structure of the lock mechanism 10 may best be understood by reference to Figures 8 to 15 which show enlarged views thereof indicating the various elements both separately and as positioned relative to each other. Figure 8 is a cross section view through the line VIII—VIII, Figure 1. As shown in this figure the lock includes housing 86 in which rotatable member 28 is mounted. The latter member contains a tumbler or other type lock so that unless the proper key is inserted therein member 28 cannot be rotated relative to housing 86. Member 28 carries an eccentric post 90 which is in engagement with the slot 92, Figure 9, of sliding member 94. Sliding member 94 is held in place directly over post 90 by retainer 96 which coacts with a rotatable switch member 100, the plate being positioned by a wire ring 98. As shown in Figure 9, sliding insulator plate 94 includes opening 102 in which is inserted spring 104 and anchor member 106, the latter member being biased in the right hand direction as seen in these figures by means of the engagement of spring 104 against the flange portion 108. Flexible shaft member 32 is attached to anchor member 106 so that as sliding member 94 is moved to the left as shown in Figures 8 and 9, flexible member 32 is pulled, thereby pulling shaft 18, Figure 1, in the upward direction and unlocking the steering mechanism.

The method of operation whereby rotation of member 28 pulls member 32 to release the steering mechanism will be evident from examination of Figures 9, 10 and 11 which show cross sectional views through section IX—IX, Figure 8, for the three principal operative positions of the lock. In the case of Figure 9, the lock member 28 is in the released position at which the key may be withdrawn and from which it cannot be rotated without the use of the correct key. In this position, post 90 of member 28 and flexible element 32 extend a maximum distance to the right as seen in Figure 9. This permits spring 20, Figure 5, to expand, thereby causing the teeth 82 of member sleeve 60 to engage the corresponding teeth 84 of hub 74 and prevent operation of the steering worm gear. When the key is inserted in keyhole member 28, that member may be rotated to the position of Figure 10. In this position it will be observed that post 90 has pulled slidable member 94 a maximum distance to the left, thereby pulling its flexible element 32 and correspondingly raising sleeve 60, Figure 5, by means of flexible element 18. In this position, the steering mechanism is released and may be operated. Figure 11 shows the lock mechanism in a further position which from the standpoint of the position of member 94, is identical with that of Figure 10. The purpose of this further position is to accomplish the electrical switching necessary to turn on the ignition system in a manner to be desired in further detail hereafter.

The electrical switch portion of the lock 10 includes insulator plates 100 and 112. As shown in Figure 9, the peripheral portion 110 of rotatable member 28 has extension 114 which passes inward therefrom through the general space occupied by post 90 and sliding member 94. This extension prevents counterclockwise rotation of member 28 by hand operating member 30 when the lock is in the position corresponding to locking of the steering mechanism. Rotation of member 28 in the opposite direction is prevented by screw 115 which engages the opening 113 in member 110 as shown in Figure 9. However, when the steering mechanism is unlocked as shown in Figure 10 projection 114 does not engage sliding member 94, hence member 28 and its peripheral portion 110 may be rotated in the counterclockwise direction. Figure 11 shows the position of the system when member 28 has been so rotated.

The projection 114 of member 28 extends inwardly beyond the space occupied by sliding member 94 to engage a corresponding recess in rotatable switch plate 100. This engagement is evident from Figure 12 which shows members 110 and 112 as viewed when positioned together in operative relation. Thus, when the member 28 is rotated from the position shown in Figure 10 to that of Figure 11, member 100 is rotated simultaneously. However, member 112 is held non-rotatably in place in a manner to be described in detail with reference to Figure 15 so that in effect members 112 and 100 are rotated relative to each other as member 28 is rotated from the position of Figure 10 to the position of Figure 11. As shown in Figure 13 insulating block 112 carries three contacts 116. Similarly, as shown in Figure 14, member 100 carries a conducting insert 118 biased by spring 120 which, when members 100 and 112 are rotated to proper angular relationship relative to each other, closes an electrical circuit through all three of the contacts 116 of member 112.

It will be noted that the conductor element 118 has three contact arms terminating in concave contactors 119 for contact with the stationary contacts 116, and three lugs 121 engaged in surface slots 123 of the rotatable insulating switch plate 100, whereby rotation of the plate causes simultaneous rotation of the conductor 118.

Thus, by connecting the ignition system of the car to two of contacts 116, the ignition system is turned on when the mechanism is rotated from the position of Figure 10 to that of Figure 11. An additional contact 116 is provided to enable the connection of a heater or similar device which is desired to be turned off automatically when the ignition is turned off.

Figure 15 is a view through the cross section line XV—XV, of Figure 8. As is evident from this view the conducting inserts 116 in member 112 extend therethrough and, as shown in Figure 8, terminate in binding posts 124 suitable for connection of electrical wiring. Figure 15 further shows notch 122 in member 112 which engages extension 86a of housing cap 125 to restrain member 112 against rotation with respect to that member.

From the above description it is evident that the above described switch provides, upon rotation of member 28 by finger piece 30, a means whereby the ignition system of a car may be connected and disconnected without altering the condition of the steering lock mechanism. This enables the operator to turn off the ignition without locking the steering gear if he so desires.

The lock structure of my invention has a substantial advantage over other steering lock structures in that it is impossible to force the mechanism by a sharp blow exerted on the steering wheel. One of the common methods of breaking other steering locking mechanisms is by a sharp turning blow on the steering wheel, the impact action of this blow being sufficient to release or even break off the engaging portions of such lock mechanisms. In steering locks constructed in accordance with my invention this method of breaking the lock is not possible for the reason that the inherent resilience of the steering shaft 48 between the point of its attachment to the steering wheel and the lower end of the shaft reduces the hammer effect of any blows made at the steering wheel and thus prevents achieving a sufficient hammer action at the locking mechanism to cause breakage. Thus, if a thief jerks the steering wheel in an effort to break the locking engagement, the steering shaft 48 merely resiliently yields and no sharp hammer blow can be passed to the locking mechanism. The shaft, the shiftable collar, the upper end of the worm gear and the gear case, which properly are of sturdy construction, can absorb the applied stresses without failure or injury.

While I have shown a particular embodiment of my invention, it will of course be understood that I do not wish to be limited thereto since many modifications both in the elements used and their cooperative arrangement may be made without departing from the spirit and scope thereof. I, of course, contemplate by the appended claims to cover any such modifications as fall within the true spirit and scope of my invention.

I claim as my invention:

1. A steering lock mechanism for use on a vehicle having a stationary tube containing a rotatable steering shaft and having a steering gear case and gear train at the lower end of the shaft, said mechanism including a non-rotatable sleeve surrounding said shaft within said case and shiftable axially of said shaft between locking and unlocked positions, locking elements depending from said sleeve, upwardly extending locking elements rotatable with said shaft, a spring biasing the sleeve downwardly for lockingly engaging said elements to hold the shaft against rotation, an elongated control member connected with said sleeve, and a dashboard key-controlled lock having means for reciprocating said control member.

2. A steering lock mechanism for use on a vehicle having a stationary tube containing a rotatable steering shaft and having a steering gear case into which the lower end of the shaft extends, said mechanism including a non-rotatably and slidably mounted sleeve immediately surrounding said shaft within said case and shiftable axially of said shaft, a spring biasing the sleeve axially in one direction, a worm gear rotatable with and secured to the lower end of the shaft within the gear case, teeth depending from the sleeve and cooperating teeth extending upwardly from the worm gear for interlocking engagement, an elongated control member connected with said sleeve for shifting the same between locking and unlocked positions relative to the worm gear, and a dashboard key-controlled lock for reciprocating said control member.

3. A lock mechanism for use with a vehicle steering apparatus having a stationary tube containing a rotatable steering shaft, a gear case at the lower end of said tube having a gear train journaled therein for effecting steering upon rotatable movement of said steering shaft, said gear train including a rotatable element journaled coaxial of said steering shaft and rotated thereby, said lock mechanism including a sleeve surrounding said steering shaft adjacent said gear case and having interengaging connection with said rotatable element, a spring urging said sleeve to move axially of said shaft toward the gear case into engagement with said rotatable element, means restraining said sleeve against rotation, and an elongated control element connected with said sleeve and operable to shift said sleeve against said spring out of interengaging connection with said rotatable element, to free the shaft for rotation.

RAY A. SANDBERG.

REFERENCES CITED

The following references are of record in the file of this patent:

UNITED STATES PATENTS

| Number | Name | Date |
|---|---|---|
| 1,752,282 | Branning | Mar. 25, 1930 |
| 2,229,525 | Sandberg | Jan. 21, 1941 |

FOREIGN PATENTS

| Number | Country | Date |
|---|---|---|
| 543,744 | France | June 9, 1922 |